US006981774B2

(12) United States Patent
Dumont et al.

(10) Patent No.: US 6,981,774 B2
(45) Date of Patent: Jan. 3, 2006

(54) VEHICLE REAR VIEW MIRROR ASSEMBLY

(75) Inventors: Daniel Dumont, Veneux-les-Sablons (FR); Bernard Duroux, Garancieres (FR)

(73) Assignee: Schefenacker Vision Systems France SA, Dammarie-les-Lys Cedex (FR)

( * ) Notice: Subject to any disclaimer, the term of this patent is extended or adjusted under 35 U.S.C. 154(b) by 0 days.

(21) Appl. No.: 10/755,989

(22) Filed: Jan. 13, 2004

(65) Prior Publication Data

US 2004/0196578 A1 Oct. 7, 2004

(30) Foreign Application Priority Data

Jan. 13, 2003 (FR) .................................. 03 00298

(51) Int. Cl.
G02B 7/182 (2006.01)
(52) U.S. Cl. ..................................................... 359/877
(58) Field of Classification Search ......... 359/871–877
See application file for complete search history.

(56) References Cited

U.S. PATENT DOCUMENTS

| 4,101,206 A | | 7/1978 | Oskam et al. |
| 4,116,538 A | | 9/1978 | Oskam |
| 4,482,211 A | * | 11/1984 | Fisher ......................... 359/877 |
| 5,042,932 A | * | 8/1991 | Pent ............................ 359/874 |
| 6,164,148 A | | 12/2000 | Brouwer |

FOREIGN PATENT DOCUMENTS

FR 2 385 137 10/1978

* cited by examiner

Primary Examiner—Euncha P. Cherry
(74) Attorney, Agent, or Firm—Warn, Hoffmann, Miller & LaLone, P.C.

(57) ABSTRACT

The invention concerns a vehicle rear view mirror, notably for an automobile, comprising a casing that contains an entrance sealed by a mirror, first drive means for pivoting the mirror on a first axis, second drive means for pivoting said mirror on a second axis perpendicular to the first axis and control means for selectively actuating the first and second drive means, the control means comprising a single rotating drive motor device.

15 Claims, 3 Drawing Sheets

VEHICLE REAR VIEW MIRROR ASSEMBLY

CROSS-REFERENCE TO RELATED APPLICATION

This application claims priority to France Patent Application Serial No. 03 00298, filed Jan. 13, 2003. The disclosure of the above application is incorporated herein by reference.

FIELD OF THE INVENTION

The present invention relates to the field of automotive side view mirror mechanisms having several pre-programmed positions controlling an actuator that moves the mirror to a user selected position.

BACKGROUND OF THE INVENTION

The mechanism provided in the present rear view mirrors for pivoting the mirror is generally complex, expensive and difficult to install by reason of the small dimensions of the housing that receives the mirror and drive means.

The present invention is intended to correct these problems and, in order to do so, its object is a rear view mirror having the structure indicated above and which is characterized in that the control means comprises a single rotating drive motor device.

The presence of a single motor device clearly makes it possible to construct the rear view mirror according to the invention with a structure simpler and more compact than that of the present rear view mirrors. It further makes it possible to lower production costs substantially.

SUMMARY OF THE INVENTION

A vehicle rear view mirror, notably for an automobile, comprising a casing that contains an entrance sealed by a mirror, a first drive means for pivoting the mirror on a first axis, second drive means for pivoting the mirror on a second axis perpendicular to the first axis and control means for selectively actuating the first and second drive means.

According to one particular embodiment of the invention, the first drive means preferably comprises a first cylindrical member rotary mounted and containing a first ramp defining a closed loop having a high point and a low point situated in two diametrically opposite positions and two first followers borne by a clamp projecting on the back face of the mirror, those first followers bearing on the first ramp in two locations situated in diametrically opposite positions and moving along the said first ramp when the first cylindrical member is driven in rotation by the motor device.

The second drive means preferably comprises a second cylindrical member rotary mounted and containing a second ramp defining a closed loop having a high point and a low point situated in two diametrically opposite positions and two second followers, each carried by a clamp projecting on the back face of the mirror, those second followers bearing on the second ramp in two locations situated in diametrically opposite positions, moving along said second ramp when the second cylindrical member is driven in rotation by the motor device and extending in a direction perpendicular to that of the first followers.

In order to reduce the frictional forces, the followers can advantageously consist of rollers resting on the ramps and carried by clamps projecting on the back face of the mirror.

Furthermore, in order for the rear view mirror to have a very compact shape, it is desirable for the first and second cylindrical members to be coaxial.

According to a first working variant, the axial opening of the first cylindrical member preferably contains a first part having, in cross section, the same dimensions as those of the axial opening of the second cylindrical member, and a second part having, in cross section, dimensions larger than those of the first part and in which the second cylindrical member is received.

Angularly equidistant teeth having a radial face are formed preferably in the interior surface of the first part of the axial opening of the first member and in the interior surface of the axial opening of the second member, the teeth of the first member have an orientation opposite that of the teeth of the second member.

In the embodiment according to the first variant, it is preferable for the first ramp to be arranged in the interior surface of the second part of the axial opening of the first cylindrical member, and for the second ramp to be in the exterior peripheral surface of the second cylindrical member.

In addition, the clamps projecting on the back face of the mirror extend preferably in an annular space arranged between the first and second cylindrical members, so that the rear view mirror can be constructed in an even more compact form.

According to a second working variant, the first and second cylindrical members are preferably identical and placed coaxially one after the other in opposite positions.

The use of identical elements makes it possible, of course, to simplify the structure of the rear view mirror and to lower the cost of the latter.

Furthermore, angularly equidistant teeth having a radial face are preferably formed in the interior surface of the openings of the first and second cylindrical members.

In the embodiment according to the second variant, first and second ramps formed in the exterior peripheral surfaces of the first and second cylindrical members each define a closed loop having a high point and a low point situated in two diametrically opposite positions, followers bearing on said ramps respectively in two locations situated in diametrically opposite positions and moving along them when the cylindrical members are driven in rotation by the motor device.

Furthermore, clamps carrying the followers and projecting on the back face of the mirror extend preferably along exterior peripheral surfaces of the first and second cylindrical members, following an axial direction.

A coupling device connected to the motor device is inserted in the openings of the first and second cylindrical members and contains on its lateral surface first pawls oriented in one direction and second pawls oriented in the opposite direction, the first pawls engaging solely with the teeth of one of the annular members when the motor device drives the coupling device in rotation in one direction, while the second pawls engage solely with the teeth of the other annular member when the motor device drives the coupling device in rotation in the opposite direction.

This set of arrangements provides pivoting of the mirror on the first and second axes both safely and regularly under the sole command of the motor device. Additionally, the first and second drive means and the control means are housed in a cylindrical receptacle situated inside the casing that contains a back provided with openings through which the clamps projecting on the rear face of the mirror extend. This receptacle protects the two cylindrical members, while ensuring that they remain in their respective positions and, consequently, enable the rear view mirror to operate with complete safety.

The motor device consists of an electric motor mounted in a circuit containing a current inverter that provides a rotation of the motor in both directions.

The circuit of the motor can advantageously include two potentiometers, each containing a conductive track and a sliding contact. The conductive tracks are situated on the opposite faces of a fixed annular support inserted between the first and second cylindrical members, while the sliding contacts are respectively integral with those members. Several positions on the sliding contacts correspond to selected adjustment positions of the mirror which are pre-programmed. Several conductors are synchronized with the pre-programmed adjustment positions. The conductors can be used to rapidly position the mirror to the pre-programmed positions by selecting the desired adjustment position using a keyboard.

Further areas of applicability of the present invention will become apparent from the detailed description provided herein after. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Two embodiments of this invention will be described below by way of non-limiting examples with reference to the attached drawings in which.

DETAILED DESCRIPTION OF THE PREFERRED EMBODIMENTS

The following description of the preferred embodiments is merely exemplary in nature and is in no way intended to limit the invention, its application, or uses.

Figure 1:
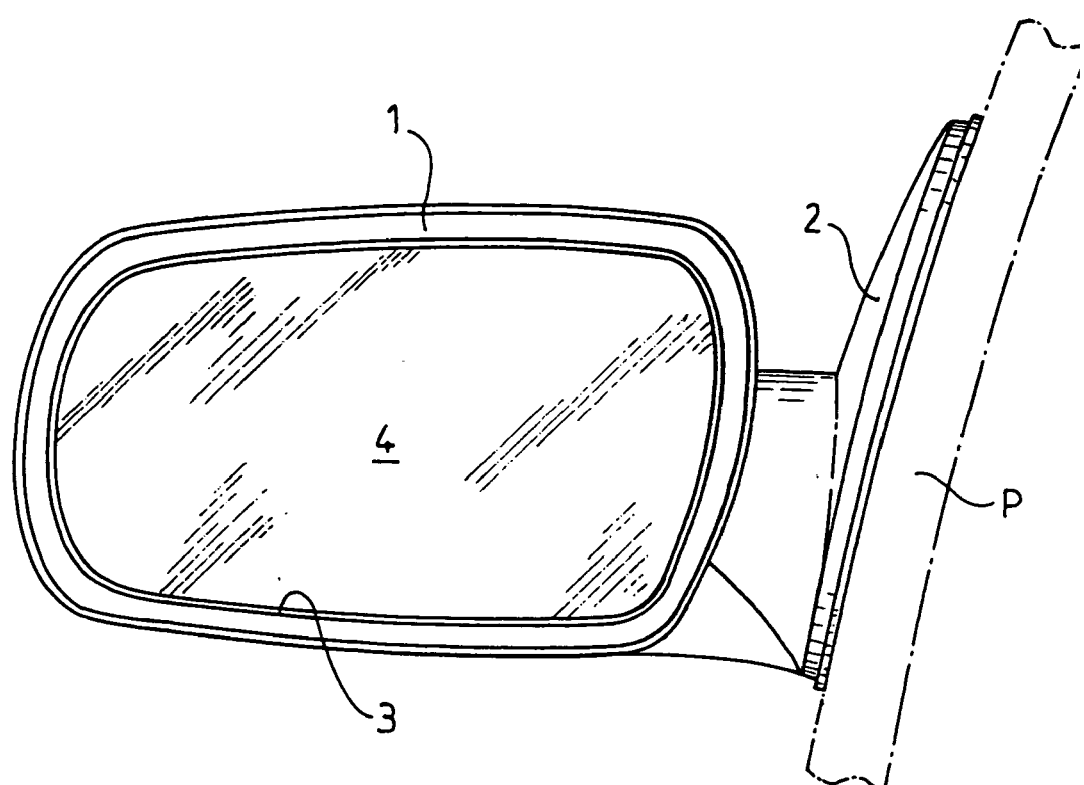
FIG. 1 is a front view of a rear view mirror according to the invention, said rear view mirror being intended to be fastened on the left door of a vehicle, which is partially represented in dot-and-dash lines.
Figure 2:
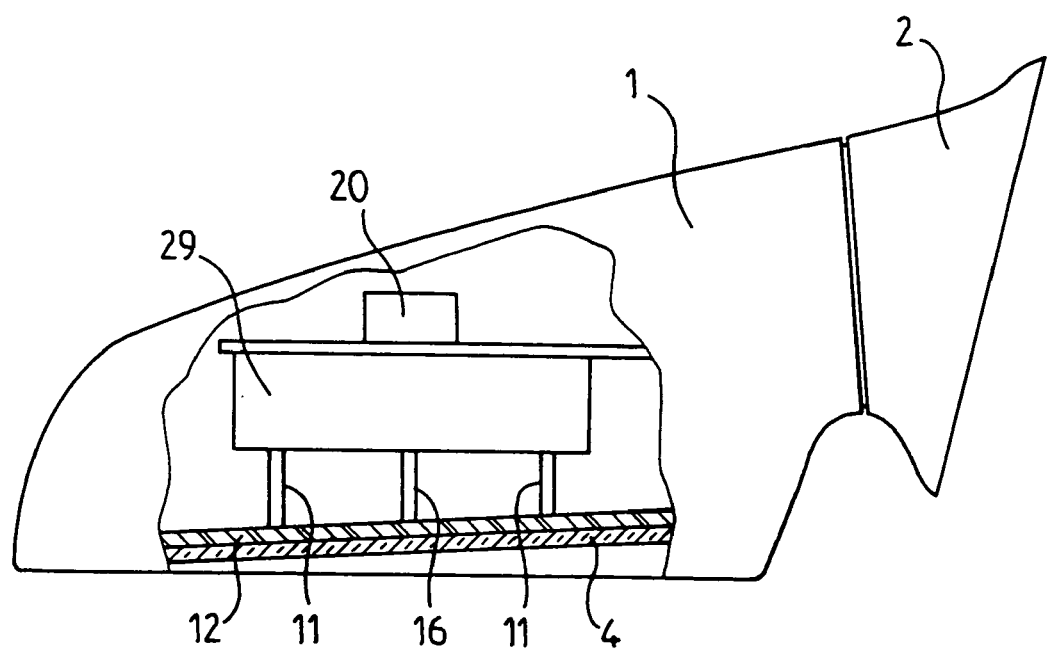
FIG. 2 is a schematic top view with cutaway of the rear view mirror shown in FIG. 1.

The rear view mirror that can be seen in FIG. 1 is intended to be fastened on the left door P of a vehicle, such as a car or a truck. It could, however, be installed on the right door of the vehicle with certain structural modifications that can be easily made by one having ordinary skill in the art.

The rear view mirror includes a casing 1 integral with a support 2 intended to be fastened on the door P in a conventional manner.

The casing 1, which can be made of metal or plastic, contains an entrance 3 sealed by a mirror 4.

As will emerge from the description below, the casing 1 contains first drive means 5 intended to pivot the mirror 4 on a first axis, second drive means 6 intended to pivot said mirror on a second axis perpendicular to the first axis, and control means 7 for selectively actuating the first and second drive means 5, 6 and enabling the driver of the vehicle to adjust the mirror 4 to the proper position.

Figure 3:
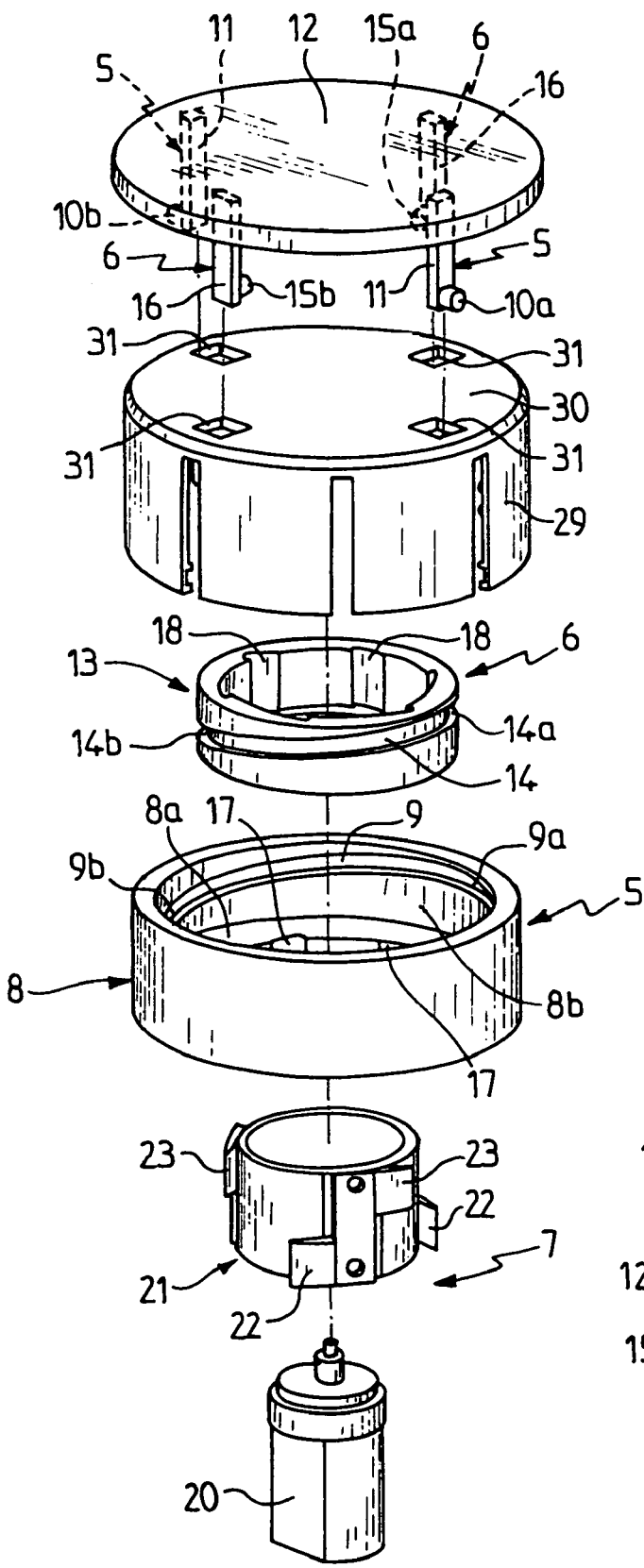
FIG. 3 is an exploded view of the mirror adjustment mechanism of the rear view mirror shown in FIGS. 1 and 2.
Figure 5:
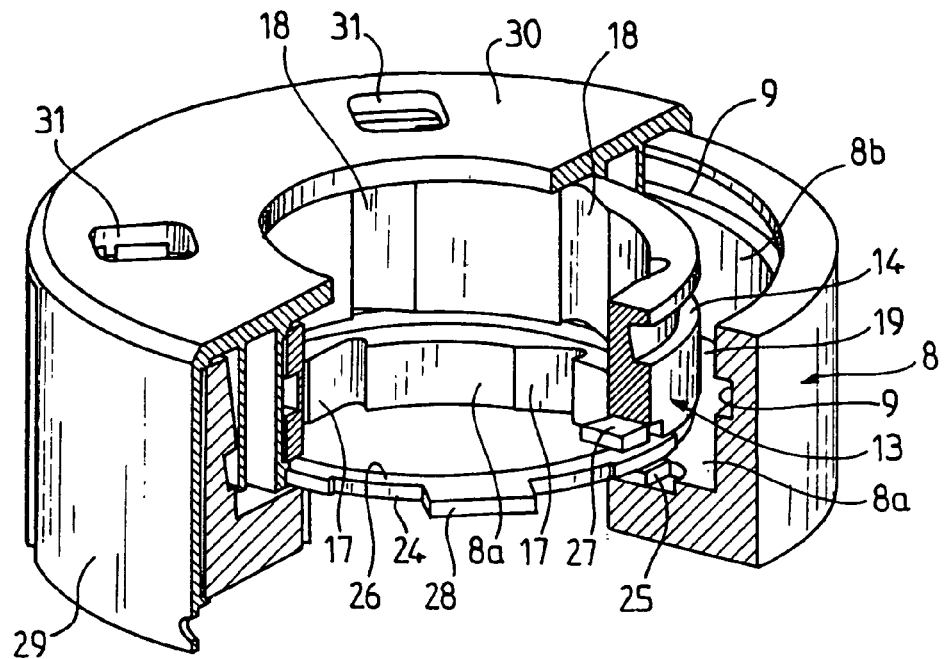
FIG. 5 is a view in perspective and in section of the adjustment mechanism in mounted position, the clamps carrying the roller being omitted for sake of clarity of the drawing.

The first means 5 is depicted in FIGS. 3 and 5. The drive means 5 includes a first cylindrical member 8 rotary-mounted in the casing 1 and containing a first ramp 9 defining a closed loop having a high point 9a and a low point 9b situated in diametrically opposite positions. Inside of the ramp 9 are two rollers 10a, 10b. The two rollers 10a, 10b are each connected to a free end of a clamp 11, that are each carried by a circular plate 12 that is fastened to the back face of the mirror 4. The rollers 10a, 10b bear on the first ramp 9 in two diametrically opposite locations and are capable of rolling along that ramp when the first member 8 is driven in rotation on its axis.

Figure 4:
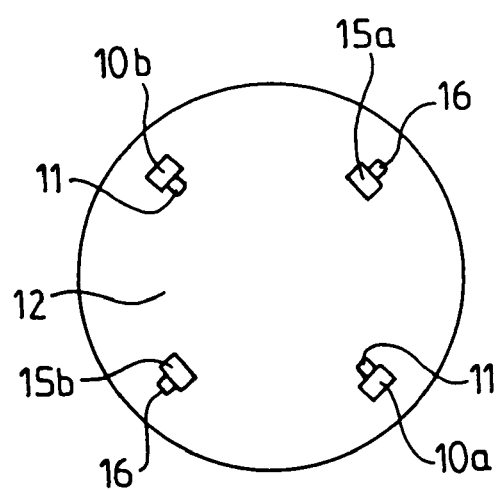
FIG. 4 is a view of the back face of the plate bearing the mirror.

Referring to FIG. 4, it will be observed that the rollers 10a, 10b are turned toward the periphery of the circular plate 12 and that their axes of rotation extend coaxially with a diameter of the circular plate 12.

The second drive means 6, which is depicted in FIGS. 3 and 5, comprises a second cylindrical member 13 rotary-mounted in the first member 8. The second cylindrical member 13 contains a second ramp 14 that defines a closed loop having a high point 14a and a low point 14b situated in two diametrically opposite positions. Inside of the second ramp 14 are two rollers 15a, 15b. The two rollers 15a, 15b are each connected to a free end of a clamp 16, that are each carried by circular plate 12 that is fastened to the back face of the mirror 4.

The rollers 15a, 15b are identical to rollers 10a, 10b. They bear on the second ramp 14 in two diametrically opposite locations and are capable of rolling along that ramp when the second element 13 is driven in rotation on its axis.

As FIG. 4 shows, the rollers 15a, 15b are turned toward each other, in contrast to rollers 10a, 10b, which are directed toward the periphery of the plate 12. FIG. 4 also shows that the clamps 16 are symmetrical in relation to the diameter, which is coaxial with the axes of rotation of rollers 10a, 10b.

Returning to FIG. 3, it will be observed that the first cylindrical member 8 possesses an axial opening containing a first part 8a having, in cross section, the same dimensions as those of the axial opening of the second cylindrical member 13, and a second part 8b having, in cross section, dimensions greater than those of part 8a and in which a second member 13 is received. Angularly equidistant teeth 17, having a radial face and extending axially, are formed in the interior surface of part 8a, while the first ramp 9 is arranged in the interior surface of part 8b.

Teeth 18 are also formed in the interior surface of the axial opening of the second cylindrical member 13. Those teeth 18 are identical to teeth 17, but their orientation is opposite that of the teeth 17. The second ramp 14, it is arranged in the exterior peripheral surface of the second member 13.

Referring now to FIG. 5, it will be observed that the second member 13, when placed in the second part 8b of the first member 8, provides an annular space 19 with the interior surface of that second part 8b.

Both of the clamps 11 and both of the clamps 16 extend into the space that receives the ramp 9, against which rollers 10a, 10b are supported, and the ramp 14, against which rollers 15a, 15b are supported.

The control means 7 is provided to turn selectively the first and second cylindrical members 8 and 13. The control means 7 comprises an electric motor 20 mounted in an electric circuit (not represented) containing a current inverter. Thus, by actuating the inverter, a user can turn the output shaft of the motor in either direction. The control means 7 also includes a coupling device 21 integrated for rotation with the output shaft of the motor 20 and inserted into the axial openings of the cylindrical members 8 and 13.

As FIG. 3 shows, the coupling device 21 having on its cylindrical lateral surface first pawls 22 oriented clockwise and second pawls 23 oriented counterclockwise. The first pawls 22 are situated at the bottom of the device 21 so as to be at the height of the teeth 17 of part 8a of the axial opening of the first cylindrical member 8. As for the second pawls 23, they are situated at the lateral surface of the device 21, so as to be at the height of the teeth 18 of the axial opening of the second cylindrical member 13. When the output shaft of the motor 20 turns clockwise, it drives the coupling device 21 with it. The pawls 22 of the latter then engage with the teeth 17 of the cylindrical member 8, which is driven in rotation in the same direction. Consequently, the rollers 10a, 10b roll along the ramp 9 and enable the mirror 4 to pivot on the first axis.

When the coupling device 21 turns clockwise, its pawls 23 move along the teeth 18 of the cylindrical member 13 without being able to engage with them. The cylindrical member 13 therefore remains immobile. If the output shaft of the motor 20 turns counterclockwise, the pawls 23 of the coupling device 21 engage with the teeth 18 of the cylindrical member 13. The cylindrical member is then driven in rotation, which enables the rollers 15a, 15b to roll along the ramp 14 and make the mirror 4 pivot on the second axis.

During this time, the pawls 22 of the coupling device 21 move along the teeth 17 of the cylindrical member 8 without being able to engage with them. The cylindrical member 8 therefore remains immobile.

In the embodiment just described, the electric circuit of the motor 20 includes a first potentiometer containing a conductive track 24 and a sliding contact 25 and a second potentiometer containing a conductive track 26 and a sliding contact 27.

As FIG. 5 shows, the conductive tracks 24, 26 are situated on the opposite faces of an annular support 28 immobilized between the cylindrical members 8, 13, while the sliding contracts 25, 27 are integral with the first member 8 and the second member 13.

The two potentiometers mounted in the electric circuit of the motor 20 provide several adjustment positions of the rear view mirror defined by pre-programmed positions on the sliding contacts 25, 27, which correspond to particular orientations of the mirror 4. Thus, the customary users of the vehicle can adjust the rear view mirror in the proper position by selecting the particular memorized position that they themselves placed in memory. This adjustment can be made very rapidly, for example, by depressing a particular key of a keyboard installed in the vehicle within reach of the driver.

Figure 6:
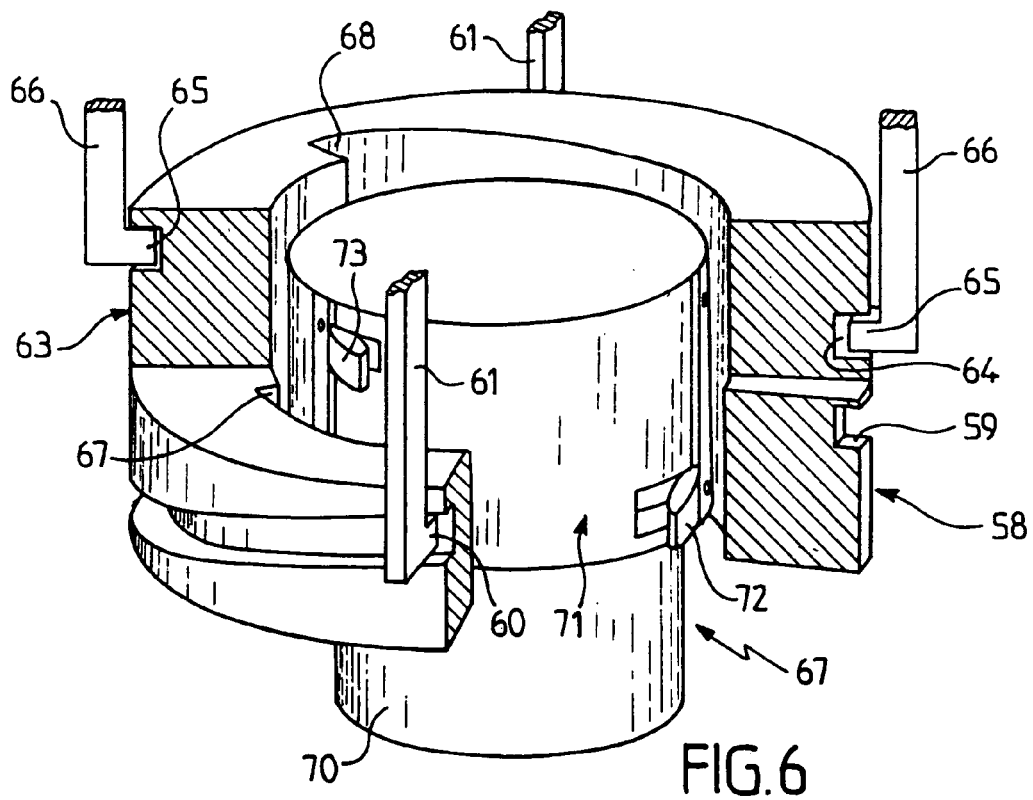
FIG. 6 is a view in perspective and in section of a working variant of the adjustment mechanism.

FIG. 6 schematically represents another adjustment mechanism of a rear view mirror according to the invention. This mechanism has numerous similarities to the one just described with reference to FIGS. 1 to 5. It includes a first rotary cylindrical member 58 containing a first ramp 59 defining a closed loop having a high point and a low point, two followers 60 bearing on the first ramp 59 at two diametrically opposite locations, a second rotary cylindrical member 63 containing a second ramp 64 defining in turn a closed loop having a high point and a low point, two followers 65 bearing on the second ramp 64 at two diametrically opposite locations and control means 67 for selectively turning the first and second cylindrical members 58, 63.

The cylindrical members 58, 63 are identical and arranged coaxially one after the other in opposite positions. They contain angularly equidistant teeth 67, 68 that are respectively arranged vertically in the interior surface of their axial opening.

FIG. 6 shows the teeth 67, 68 having a radial face. As the members 58, 63 are placed in opposite positions, their respective teeth will have opposite orientations. The followers 60 have, at the lower end, two pawls 61 integral with the back face of the mirror (not represented in FIG. 6), while followers 65 have, at the lower end, two clamps 66 also integral with the back face of the mirror. Like the clamps 11 and 16 of the first embodiment, clamps 61 and 66 are placed along two perpendicular diameters.

The ramps 59, 64 are arranged in the exterior peripheral surfaces of the cylindrical members 58, 63. The clamps 61, 66 extend along those exterior peripheral surfaces in an axial direction.

The control means 67 comprises an electric motor 70 mounted in an electric circuit similar to that of the motor 20 of the rear view mirror described with reference to FIGS. 1 to 5, and a coupling device 71 integral on rotation with the output shaft of the motor 70. The coupling device 71 is inserted in the axial openings of the cylindrical members 58 and 63 and contains on its lateral surface first pawls 72 oriented clockwise and second pawls 73 oriented counterclockwise. The pawls 72 are situated at the height of the teeth 67 of the cylindrical member 58, while pawls 73 are situated at the height of the teeth 68 of cylindrical member 63. Considering that the pawls 72 and 73 perform the same function as pawls 22 and 23 of the coupling device 21 of the rear view mirror described with reference to FIGS. 1 to 5, a description of the operation of the adjustment mechanism represented in FIG. 6 will be omitted here.

It is evident from the foregoing that the present invention makes it possible to construct a rear view mirror containing a compact adjustment mechanism with only one motor device and the operation of which is reliable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle rear view mirror comprising:
    a casing that contains an entrance sealed by a mirror;
    a first drive means for pivoting said mirror on a first axis, wherein said first drive means has a first cylindrical member rotatably mounted and having a first ramp defining a closed loop having a high point and a low point situated in diametrically opposite positions;
    a second drive means for pivoting said mirror on a second axis perpendicular to the first axis, wherein said second drive means has a second cylindrical member rotatably mounted and containing a second ramp defining a closed loop having a high point and a low point situated in two diametrically opposite positions;
    an electric motor for selectively driving said first and second drive means in rotation;
    two first followers bearing on said first ramp in said first drive means at two locations situated in diametrically opposite positions and moving along said first ramp when said first cylindrical member is driven in rotation by said electric motor; and
    two second followers bearing on said second ramp of said second drive means and two locations situated in diametrically opposite positions, said two second followers extending in a direction perpendicular to that of said first followers, wherein said second followers move along said second ramp when said second cylindrical member is driven in rotation by said electric motor.

2. Rear view mirror according to claim 1, wherein the followers further comprise rollers resting on the ramps and carried by clamps projecting on the back face of the mirror.

3. Rear view mirror according to claim 2, wherein the clamps projecting on the back face of the mirror extend in an annular space arranged between the first and second cylindrical members.

4. Rear view mirror according to claim 1, wherein the first and second cylindrical members are coaxial.

5. Rear view mirror according to claim 4, further comprising an axial opening on the first cylindrical member containing a first part having a cross section the same dimensions as those of an axial opening of the second cylindrical member, and a second part of said axial opening of said first cylindrical member having a cross section dimension larger than those of the first part and in which the second cylindrical member is received.

6. Rear view mirror according to claim 5, further comprising angularly equidistant teeth having a radial face formed in the interior surface of the first part of the axial opening of the first member and in the interior surface of the axial opening of the second member, the teeth of the first member having an orientation opposite that of the teeth of the second member.

7. Rear view mirror according to claim 5, wherein the first ramp is arranged in the interior surface of the second part of the axial opening of the first cylindrical member, while the second ramp is arranged in the exterior peripheral surface of the second cylindrical member.

8. Rear view mirror according to claim 1, wherein the first and second drive means and the control means are housed in a cylindrical receptacle situated inside the casing and containing a back provided with openings through which the clamps, projecting on the rear face of the mirror, extend.

9. Rear view mirror according to claim 1, wherein the first and second cylindrical members are preferably identical and placed coaxially one after the other in opposite positions.

10. Rear view mirror according to claim 9, further comprising angularly equidistant teeth having a radial face formed in the interior surface of the openings of the first and second cylindrical members.

11. Rear view mirror according to claim 9, wherein the first and second ramps made in the exterior peripheral surfaces of the first and second cylindrical members each define a closed loop having a high point and a low point situated in two diametrically opposite positions, followers bearing on said ramps respectively in two locations situated in diametrically opposite positions and moving along them when the cylindrical members are driven in rotation by the electric motor.

12. Rear view mirror according to claim 11, wherein the followers are carried by clamps projecting on the back face of the mirror and extending along exterior peripheral surfaces of the first and second cylindrical members, following an axial direction.

13. A vehicle rear view mirror comprising;
a casing that contains an entrance sealed by a mirror;
a first drive means for pivoting said mirror on a first axis;
a second drive means for pivoting said mirror on a second axis perpendicular to said first axis;
an electric motor for selectively driving said first and second drive means in rotation, having a first drive means with a first cylindrical member rotatably mounted and containing a first ramp defining a closed loop having a high point and a low point situated in two diametrically opposite positions and two first followers bearing on the first ramp in two locations situated in diametrically opposite positions and moving along the first ramp when the first cylindrical member is driven in rotation by the electrical motor; and
a coupling device connected to the electric motor, wherein said coupling device is inserted in an opening formed in said first cylindrical member, and contains on its lateral surface first pawls oriented in one direction and a plurality of teeth formed on said first cylindrical member when the electric motor drives the coupling device in rotation in one direction.

14. A vehicle rear view mirror comprising:
a casing that contains an entrance sealed by a mirror;
a first drive means for pivoting the mirror on a first axis;
a second drive means for pivoting said mirror on a second axis perpendicular to the first axis;
an electric motor for selectively driving the first and second drive means in rotation wherein the first drive means has a first cylindrical member rotatably mounted and containing a first ramp defining a closed loop having a high point and a low point situated in two diametrically opposite positions and two first followers bearing on the first ramp in two locations situations in diametrically opposite positions and moving along said first ramp when the first cylindrical member is driven in rotation by the electric motor;
a circuit mounted to said electric motor, said circuit having a current inverter enabling said electric motor to operate bi-directionally, wherein the circuit of the motor includes a potentiometer containing a conductive track and a sliding contact, the conductive track being situated on the face of a fixed support adjacent said first cylindrical member, while the sliding contact is respectively integral with said cylindrical member, several positions of the sliding contact corresponding to selected adjustment positions of the mirror being memorized.

15. A vehicle rear view mirror comprising:
a casing that contains an entrance sealed by a mirror;
a first drive arrangement for pivoting said mirror on a first axis, wherein said first drive arrangement has a cylindrical member rotatably mounted and having a first ramp defining a closed loop having a high point and a low point situated in diametrically opposite positions;
a second drive arrangement for pivoting said mirror on a second axis perpendicular to the first axis, wherein said second drive arrangement has a second cylindrical member rotatably mounted and containing a second ramp defining a closed loop having a high and a low point situated in two diametrically opposite positions;
an electric motor for selectively driving said first and second drive arrangements in rotation;
two followers bearing on said first ramp in said first drive arrangement at two locations situated and diametrically opposite positions and moving along said first ramp when said cylindrical member is driven in rotation by said electrical motor; and
an axial opening on the first cylindrical member containing a first part having a cross-section the same dimensions as those of an axial opening of the second cylindrical member, and a second part of said axial opening of said first cylindrical member having a cross-section dimension larger than those of the first part and in which the second cylindrical member is received.

* * * * *